United States Patent
Im

(10) Patent No.: US 7,921,256 B2
(45) Date of Patent: Apr. 5, 2011

(54) MEMORY MODULE AND MEMORY MODULE SYSTEM

(75) Inventor: Jeon Taek Im, Anseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 499 days.

(21) Appl. No.: 12/027,007

(22) Filed: Feb. 6, 2008

(65) Prior Publication Data
US 2008/0222378 A1 Sep. 11, 2008

(30) Foreign Application Priority Data

Mar. 8, 2007 (KR) .................. 10-2007-0023045

(51) Int. Cl.
*G06F 12/00* (2006.01)
(52) U.S. Cl. ........................................ 711/103
(58) Field of Classification Search .................. None
See application file for complete search history.

(56) References Cited

U.S. PATENT DOCUMENTS

| 5,848,258 | A | * | 12/1998 | Fenwick et al. | .................. 711/5 |
| 6,633,947 | B1 | | 10/2003 | Holman et al. | |
| 2004/0266395 | A1 | * | 12/2004 | Pailles et al. | .................. 455/411 |
| 2006/0129767 | A1 | | 6/2006 | Berenyi et al. | |
| 2007/0280016 | A1 | * | 12/2007 | Bucksch | ....................... 365/201 |

FOREIGN PATENT DOCUMENTS

JP 20020202911 7/2002
KR 1020070023045 9/2004

* cited by examiner

*Primary Examiner* — Hiep T Nguyen
(74) *Attorney, Agent, or Firm* — F. Chau & Associates, LLC

(57) ABSTRACT

A memory module and a memory module system are provided. The memory module system includes a plurality of memory modules each module comprising a plurality of memory blocks and a plurality of corresponding routers each storing a channel identification (ID) and a module ID corresponding to one or more memory blocks; and a controller configured to access the memory modules. During initialization, the controller reads and stores the channel ID and the module ID from each of the routers. The controller outputs a channel ID and a module ID that correspond to one or more memory blocks to be accessed.

19 Claims, 9 Drawing Sheets

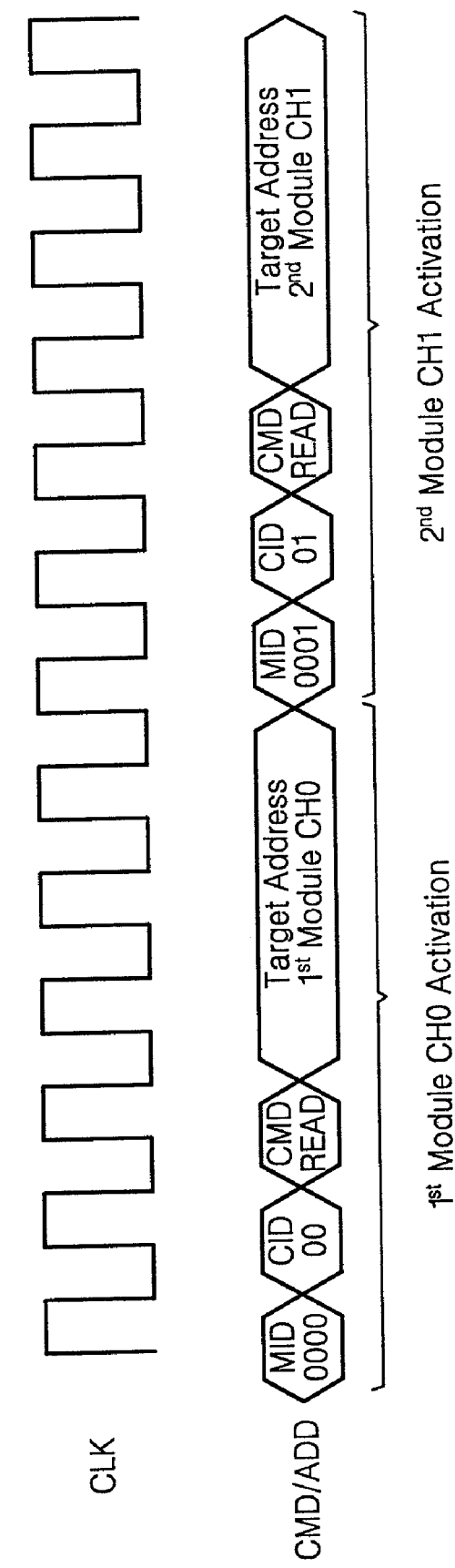

MEMORY MODULE AND MEMORY MODULE SYSTEM

CROSS-REFERENCE TO RELATED PATENT APPLICATION

This application claims priority, under 35 U.S.C. §119, of Korean Patent Application No. 10-2007-0023045, filed on Mar. 8, 2007, which is incorporated by reference herein in as if set forth in its entirety.

FIELD OF THE INVENTION

The present invention relates to a memory module and memory module system, and more particularly, to a memory module and memory module system supporting capacity extension and data continuity.

BACKGROUND OF THE INVENTION

FIG. 1 is a schematic block diagram of a conventional memory module system 1. Referring to FIG. 1, the memory module system 1 includes a plurality of memory modules 10, a controller 20, and a memory buffer 30.

Each of the memory modules 10 includes a plurality of memory blocks 11. The memory blocks 11 are connected to the controller 20 via respective corresponding channels CH0, CH1, CH2, and CH3. The controller 20 includes a plurality of channel controls for respectively controlling the plurality of the channels CH0, CH1, CH2, and CH3. The controller 20 outputs selection signals CS0-CH0 through CS3-CH3.

In the conventional memory module system 1, four sets of selection signals CS0-CH0 through CS3-CH3 respectively corresponding to four memory blocks 11 in each memory module must be output in order to access the memory blocks 11. For instance, in a case where four memory blocks 11 are included in each of the four memory modules 10, as shown in FIG. 1, 16 selection signals CS0-CH0 through CS3-CH3 are needed in order to access all of the memory modules 10. Accordingly, when the capacity of the memory module system 1 is increased, the number of control signals and the number of pins for transmitting and receiving the control signals are also increased. As a result, the circuit of the controller 20 becomes complicated.

FIG. 2 is a schematic block diagram of another conventional memory module system 2. Referring to FIG. 2, the memory module system 2 includes a plurality of memory modules 40, a controller 50, and a memory buffer 60.

In order to reduce the number of control signals compared to the memory module system 1 shown in FIG. 1, the memory module system 2 outputs module selection signals CS0, CS1, CS2, and CS3 only when accessing memory blocks 41 included in each of the memory modules 40.

However, when only the module selection signals CS0, CS1, CS2, and CS3 are output, the memory module system 2 needs to simultaneously access all of the memory blocks 41 included in each memory module 40. In other words, when one memory module 40 is selected, all of the memory blocks 41 included in the selected memory module 40 are simultaneously selected. As a result, the memory blocks 41 cannot be selected independently and individually.

Moreover, when there is a memory block 41 that is not connected with one of a plurality of channels CH0, CH1, CH2, and CH3, e.g., when there is an empty memory block 41, the memory module system 2 does not operate. As a result, the memory module system 2 must include as many memory blocks 41 as the number of channels in each memory module 40.

Furthermore, when the memory module system 1 or 2 shown in FIGS. 1 and 2, respectively, uses NAND flash memory modules, the controller 20 or 50 needs to control the memory module system 1 or 2 by performing wear leveling, bad block management, logical block address and physical block address management, etc.

Accordingly, when the capacity of the memory module system 1 or 2 is increased, the design of the controller 20 or 50 and software (embedded firmware) for controlling the controller 20 or 50 become more complicated. In addition, since the capacity of the memory buffer 30 or 60 connected with the controller 20 or 50 is also increased, cost for manufacturing the memory module system 1 or 2 is increased.

SUMMARY OF THE INVENTION

Some embodiments of the present invention provide a memory module that reduce the size of a memory module system and allow memory blocks to be selectively accessed, and a memory module system using the memory module. Some aspects of the present invention provide an approach for reducing the number of selection signals needed by a controller accessing memory blocks and for selectively accessing the memory blocks.

According to some exemplary embodiments of the present invention, there is provided a memory module including a plurality of memory blocks; and a plurality of routers connected with corresponding memory blocks, respectively. Each of the routers compares a received channel identification (ID) and a received module ID with a stored channel ID and a stored module ID, respectively, and accesses the memory block connected to the router, based on the result of the comparison. The received channel identification (ID) and the received module ID are output by and received from a controller on a motherboard.

According to some exemplary embodiments of the present invention, there is provided a compatible motherboard comprising: a controller configured to output a channel ID and a module ID; and at least one memory slot configured to receive a memory module having first and second memory blocks and corresponding first and second routers, each router being configured to receive the channel ID and the module ID output by the controller. Each of the first and second memory blocks is independently accessed if different channel IDs are stored in each router and based upon the channel ID output by the controller. Both of the first and second memory blocks are simultaneously accessed if the same channel ID is stored in both corresponding routers and if the channel ID output by the controller matches the channel ID stored in both corresponding routers. The controller is configured to store channel IDs output by the routers during an initialization.

Each of the routers may include a first register configured to store the stored channel ID; a second register configured to store the stored module ID; and a comparison circuit configured to compare the received channel ID and the received module ID with the stored channel ID and the stored module ID, respectively, and access the memory block connected to the router, based on the result of the comparison.

Two or more routers in each memory module may store the same channel ID in their first registers or store different channel IDs in their first registers.

The memory module may further include a module ID generator configured to generate a module ID for all of the routers. The module ID generator may be implemented using a dual in-line package (DIP) switch.

The stored channel ID and the stored module ID may be set for each of the routers in order to identify a memory block connected with each router among the plurality of memory blocks. The received channel ID and the received module ID may be output from the controller in order to identify a memory block to be accessed among the plurality of memory blocks.

Each of the routers may include a plurality of pins configured to receive a first voltage and a second voltage which are used to set the stored channel ID and the stored module ID. The first voltage may be a power supply voltage and the second voltage may be a ground voltage.

Each of the memory blocks may include at least one NAND flash memory chip.

According to other embodiments of the present invention, there is provided a memory module system including a plurality of memory modules each comprising a plurality of memory blocks and a plurality of routers each router storing a channel ID and a module ID corresponding to one or more of the memory blocks; and a controller configured to access the memory modules. During an initialization procedure, the controller reads and stores the stored channel IDs and the stored module IDs, which are stored in the routers. During a first memory access, the controller outputs a selected channel ID and module ID that correspond to at least one memory block to be accessed, and during a second (subsequent) memory access the controller outputs a second selected channel ID and module ID that correspond to at least one memory block to be accessed.

Each of the routers may include a first register configured to store the its channel ID; a second register configured to store the its module ID; and a comparison circuit configured to receive the channel ID and the module ID from the controller, compare the received channel ID and the received module ID with the stored channel ID and the stored module ID, respectively, and access at least one of the memory blocks, based on the result of the comparison.

Two routers of one memory module may store the same channel ID in their first registers or store different channel IDs in their first registers.

Each of the routers may include a plurality of pins configured to receive a first voltage and a second voltage which are used to set its channel ID and its module ID. The first voltage may be a power supply voltage and the second voltage may be a ground voltage.

Each of the memory modules may further include a module ID generator configured to generate a module ID for each of the routers. The module ID generator may be implemented using a DIP switch.

The channel ID of each router of one memory module may be set differently in order to identify and independently access a each block among the plurality of memory blocks in the module. The channel ID and the module ID may be output from the controller in order to identify the memory module and each memory block to be accessed among the plurality of memory blocks in the module.

Each of the memory blocks may include at least one NAND flash memory chip. The controller may generate a command and an address used to access the memory block and outputs them to the router.

The present invention now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise.

BRIEF DESCRIPTION OF THE DRAWINGS

The above and other features of the present invention will become more apparent by describing in detail exemplary embodiments thereof with reference to the attached drawings in which:

FIG. 8A is a timing chart illustrating an independent access operation in the memory module system of FIG. 5.

DETAILED DESCRIPTION OF THE EXEMPLARY EMBODIMENTS OF THE INVENTION

Figure 1:
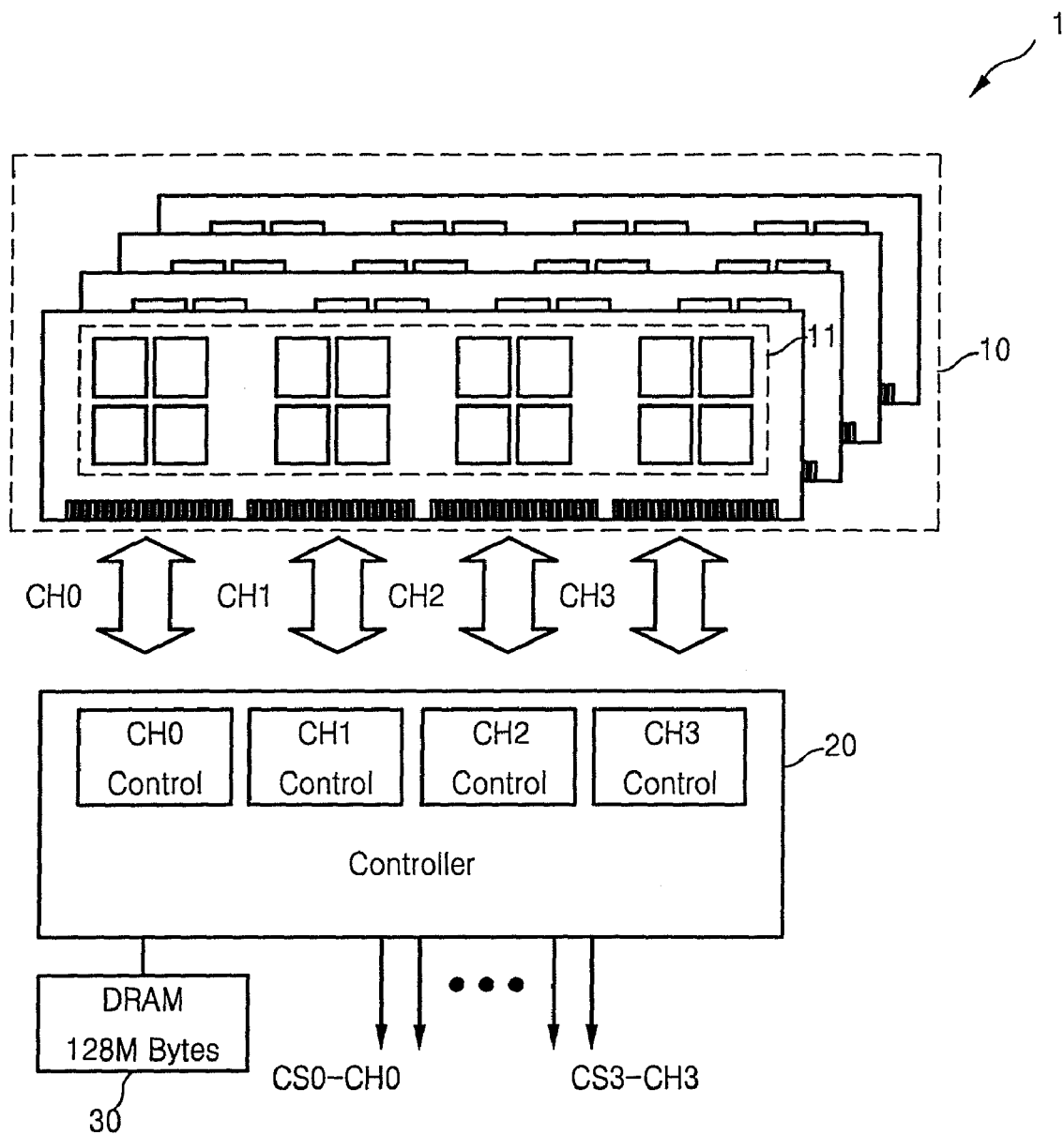
FIG. 1 is a schematic block diagram of a conventional memory module system.
Figure 2:
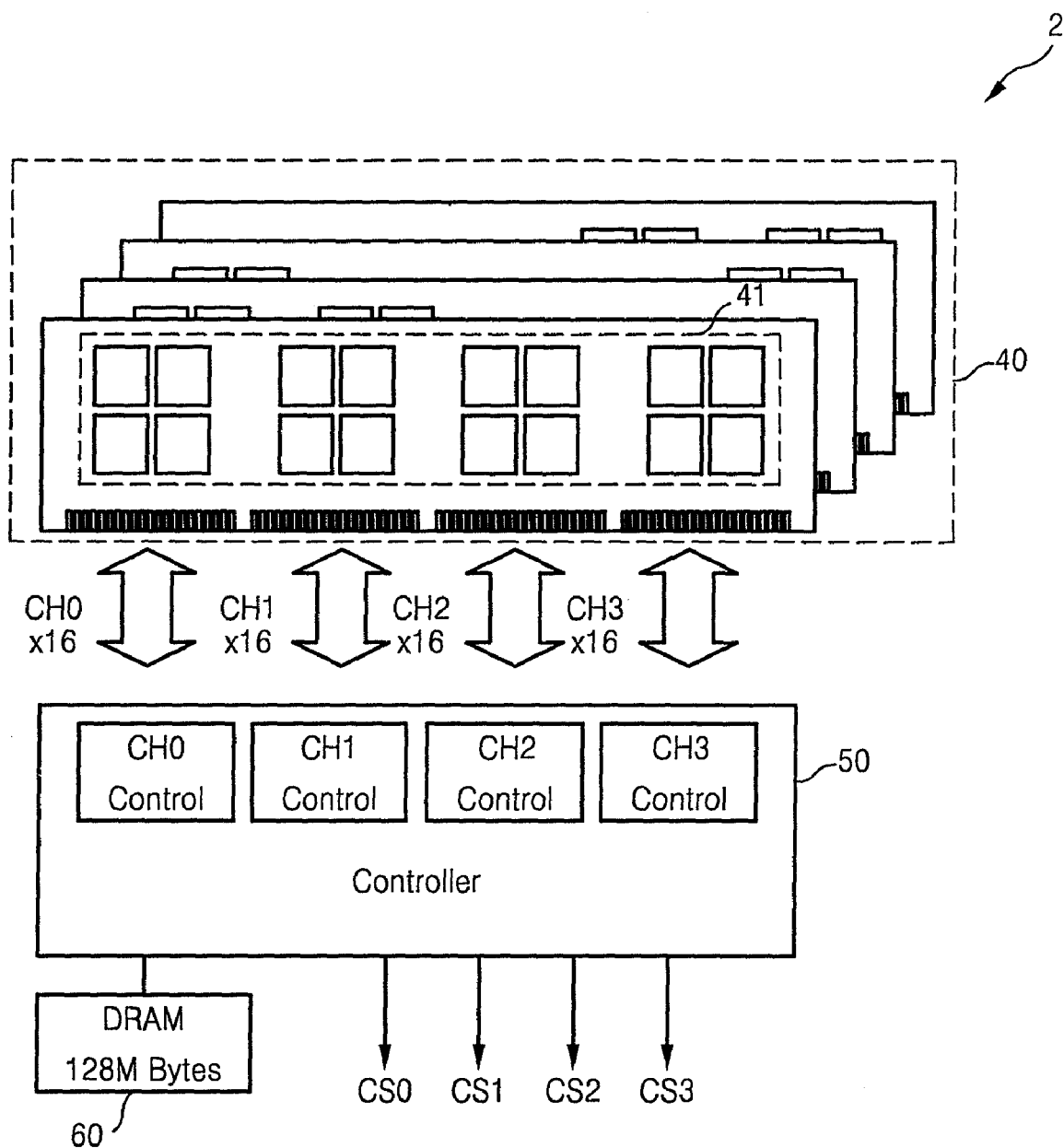
FIG. 2 is a schematic block diagram of another conventional memory module system.
Figure 3:
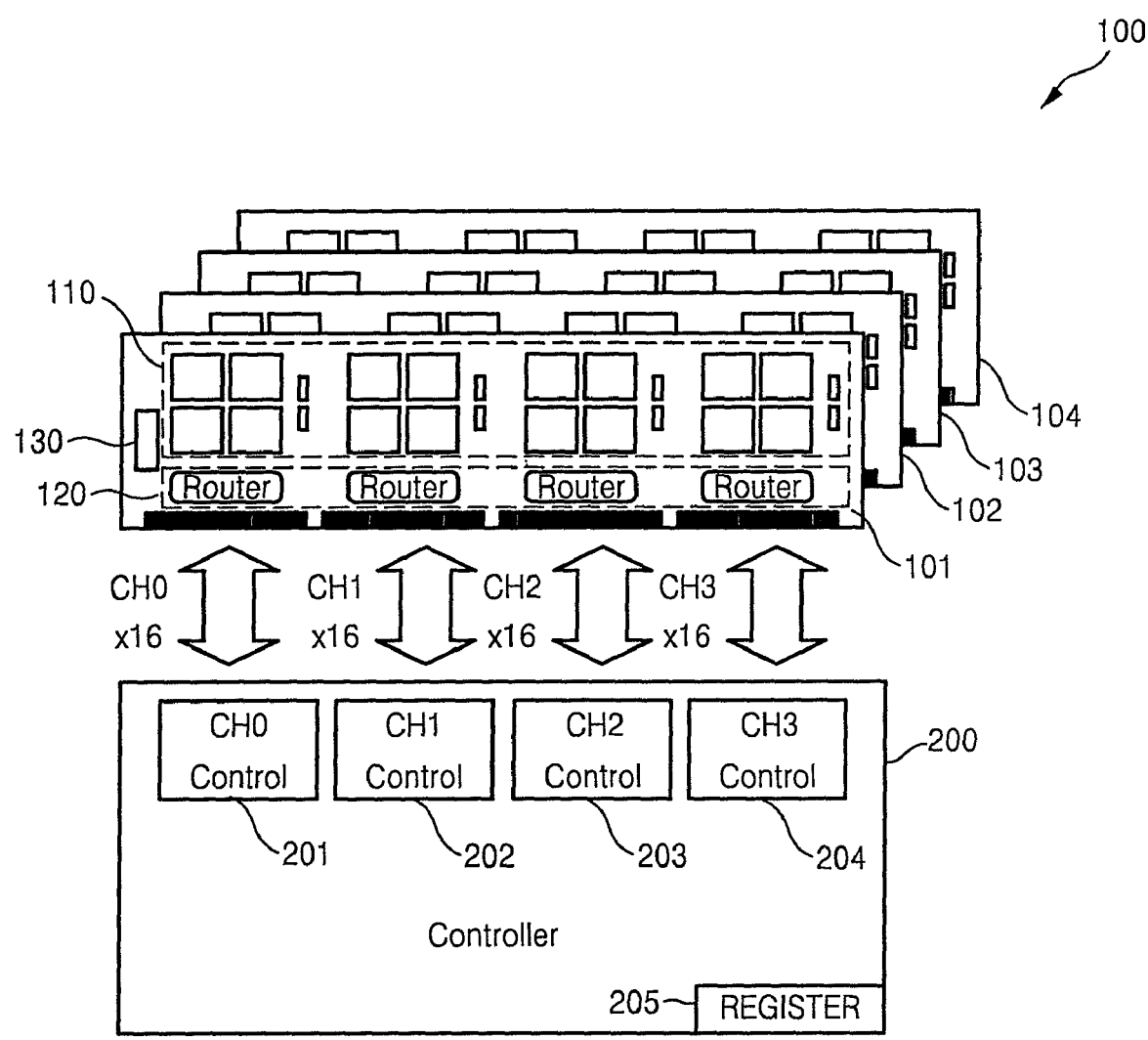
FIG. 3 is a schematic block diagram of a memory module system according to an exemplary embodiment of the present invention.

FIG. 3 is a schematic block diagram of a memory module system 100 according to an exemplary embodiment of the present invention. Referring to FIG. 3, the memory module system 100 includes a plurality of memory modules 101, 102, 103, and 104 and a controller 200.

Each of the memory modules 101, 102, 103, and 104 includes a plurality of memory blocks 110, a plurality of routers 120, and a module identification (ID) generator 130. The memory modules 101, 102, 103, and 104 are installed at respective memory slots (not shown) and are connected with the controller 200 via a plurality of channels CH0, CH1, CH2, and CH3.

In the current embodiment of the present invention, there are as many routers and memory blocks as there are channels connecting to each of the memory modules 101, 102, 103, and 104. However, each of the memory modules 101, 102, 103, and 104 includes fewer routers and memory blocks than the number of channels in other embodiments of the present invention (see FIG. 4).

Figure 4:
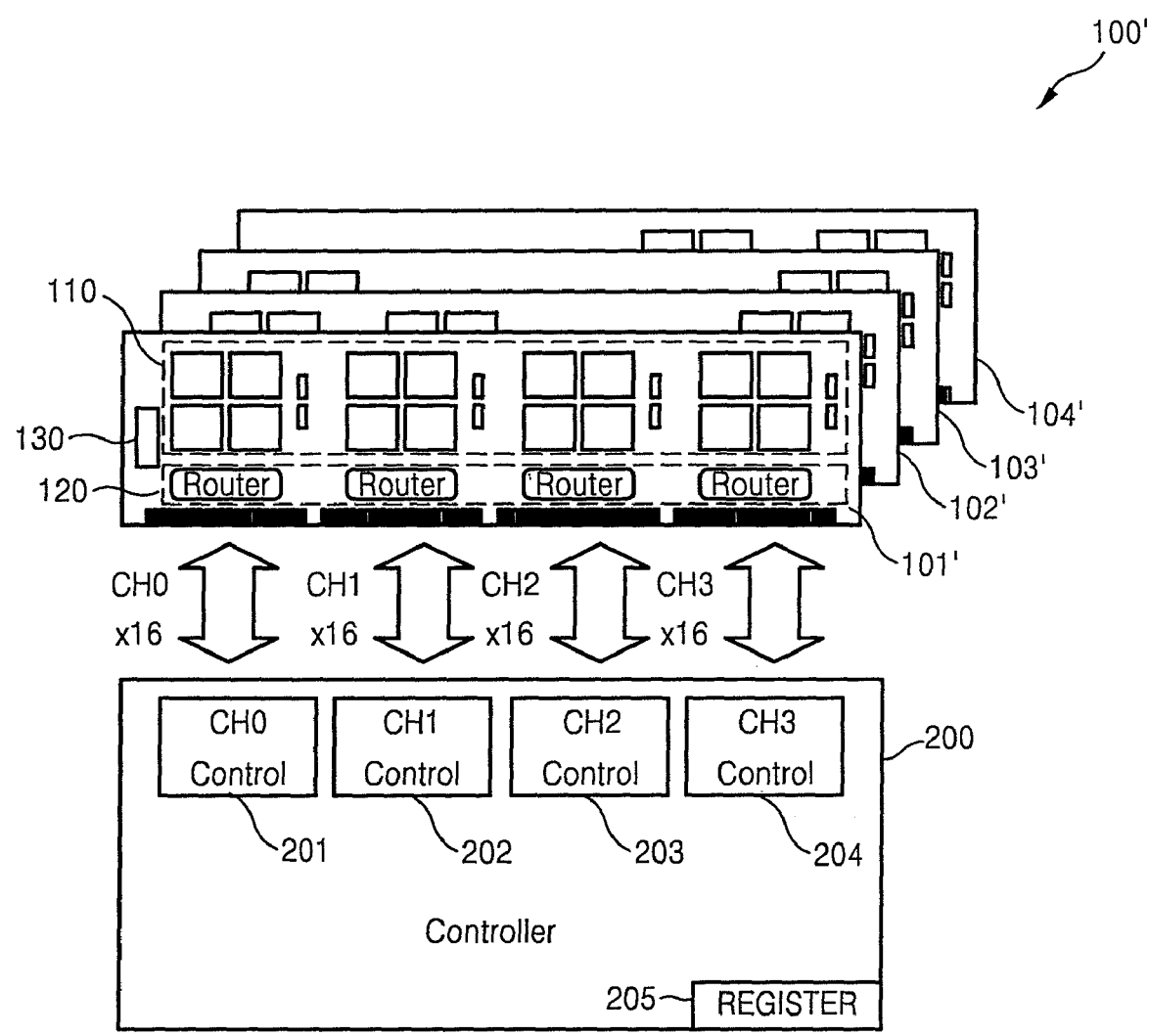
FIG. 4 is a schematic block diagram of a memory module system according to another embodiment of the present invention

FIG. 4 is a schematic block diagram of a memory module system 100' according to another exemplary embodiment of the present invention. Referring to FIG. 4, the first memory module 101' includes four memory blocks 110 and four routers 120 and connects to all of the channels CH0, CH1, CH2, and CH3, the same as is in FIG. 3 described above.

However, a second memory module 102' includes only three memory blocks 110 and three routers 120 and connects to only three channels (e.g., CH0, CH1, and CH3) among the plurality of the channels CH0, CH1, CH2, and CH3. In addition, referring to FIG. 4, each of third and fourth memory modules 103' and 104' includes only two memory blocks 110 and two routers 120 and connects to only two channels (e.g., CH0 and CH3 or CH2 and CH3) among the plurality of the channels CH0, CH1, CH2, and CH3.

As described above, the second through fourth modules 102' through 104' shown in FIG. 4 are different from the memory modules 101 through 104 shown in FIG. 3 only in the numbers of memory blocks and routers that they include, but have the same operation and functions. Thus, the following description of memory modules 101 through 104 shown in FIG. 3 will also tend to describe the first through fourth modules 101 through 104' shown in FIG. 4.

Each of the memory modules 101 through 104 includes a plurality of the memory blocks 110, a plurality of the routers 120, and the module ID generator 130. Each of the memory blocks 110 included in each of the memory modules 101 through 104 may be implemented by at least one NAND flash memory chip.

Each of the routers 120 stores a first channel ID and a first module ID, which indicates the position of each memory block 110. The first channel ID and the first module ID respectively indicate the ID of a channel to which the memory block 110 connects and the ID of the memory module 101, 102, 103, or 104.

The module ID generator 130 sets a module ID of each of the memory modules 101 through 104 based on a number allocated to a motherboard memory slot (not shown) into which each of the memory modules 101 through 104 is installed. The module ID generator 130 may be implemented using a dual in-line package (DIP) switch.

The controller 200 includes channel control circuits 201, 202, 203, and 204 for respectively controlling the channels CH0, CH1, CH2, and CH3 and a register 205 for storing a second channel ID and a second module ID. When the memory module system 100 is initialized, the controller 200 reads and stores first channel IDs and first module IDs, which are output by the routers 120 included in the memory modules 101 through 104. The memory module system 100 stores the IDs in the register 205. When the controller 200 accesses one among the memory modules 101 through 104, the controller 200 outputs a channel ID and a module ID, which correspond to the selected one among the memory modules 101 through 104. For example, controller 200 outputs from the register 205 a second channel ID and a second module ID. In this example, the memory module system 100 compares the second channel ID and the second module ID, which are output from the controller 200, with the channel ID and the module ID, which are stored in each of the routers 120, and enables only the router 120 that has the channel ID and the module ID which are the same as the second channel ID and the second module ID so that a connected memory block 110 is accessed.

Figure 5:
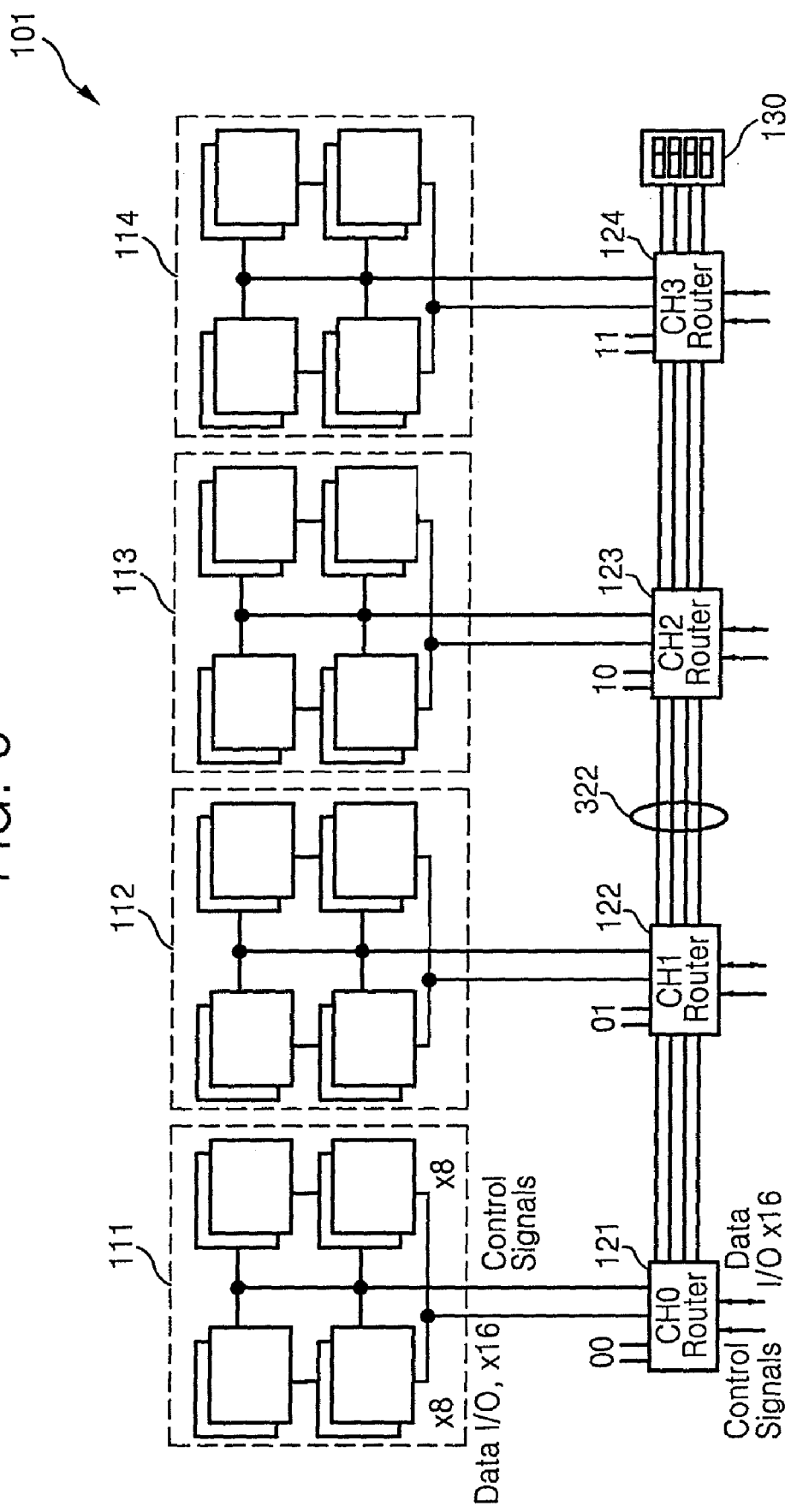
FIG. 5 is a schematic block diagram of a memory module 101 shown in FIGS. 3 and 4, according to some embodiments of the present invention.

FIG. 5 is a schematic block diagram of the memory module 101 shown in FIGS. 3 and 4. The operation of the memory modules 101, 102, 103, and 104 are the same, and therefore, only the operation of the first memory module 101 will be described. Referring to FIGS. 3 through 5, the memory module 101 includes a plurality of memory blocks 111, 112, 113, and 114, a plurality of routers 121, 122, 123, and 124, and the module ID generator 130.

Each of the memory blocks 111 through 114 may include a plurality of NAND flash memory chips. In the current exemplary embodiment of the present invention, each of the memory blocks 111 through 114 includes 8 NAND flash memory chips.

Each of the routers 121 through 124 interfaces the controller 200 and a corresponding one among the memory blocks 111 through 114. Each of the routers 121 through 124 outputs control signals and data received from the controller 200 to the corresponding memory block 111, 112, 113, or 114. And each of the routers 121 through 124 outputs data received from the corresponding memory block 111, 112, 113, or 114 to the controller 200. Each of the routers 121 through 124 includes a plurality of connection pins for storing a channel ID ("00", "01", "10", "11"). Each of the connection pins in each router 121, 122, 123, or 124 is connected to a power supply voltage or to a ground voltage to store the channel ID.

For instance, the first router 121 stores "00" as the channel ID; the second router 122 stores "01" as the channel ID; the third router 123 stores "10" as the channel ID; and the fourth router 124 stores "11" as the channel ID. In this case, the memory blocks 111 through 114 are independently enabled. Alternatively, the routers 121, 122, 123, and 124 may store the same channel ID. For instance, all of the connection pins included in the routers 121 through 124 may be connected with the ground voltage, so that all of the routers 121 through 124 store the same channel ID "00". In this case, the memory blocks 111 through 114 are simultaneously enabled.

The module ID generator 130 generates a module ID based on the motherboard memory slot (not shown) into which the memory module 101 is installed. The module ID generator 130 may be implemented using a DIP switch. In the exemplary embodiments of the present invention, the module ID generator 130 includes four switches. For instance, a module ID of "0000" can be set for the memory module 101 by connecting all switches of the module ID generator 130 with the ground voltage. In the same manner, the module IDs of other memory modules can be set by connecting each of the switches of the module ID generator 130 included in each memory module to the power supply voltage or the ground voltage. When the four switches are used for each memory module, 16 different module IDs can be set. In other words, 16 memory modules can be installed in a single memory module system into 16 motherboard memory slots (not shown). The module ID generator 130 is simultaneously connected with the routers 121 through 124 via a plurality of signal lines 322 and outputs the module ID to each of the routers 121 through 124. In other words, all four of the routers included in one memory module store the same module ID.

Figure 6:
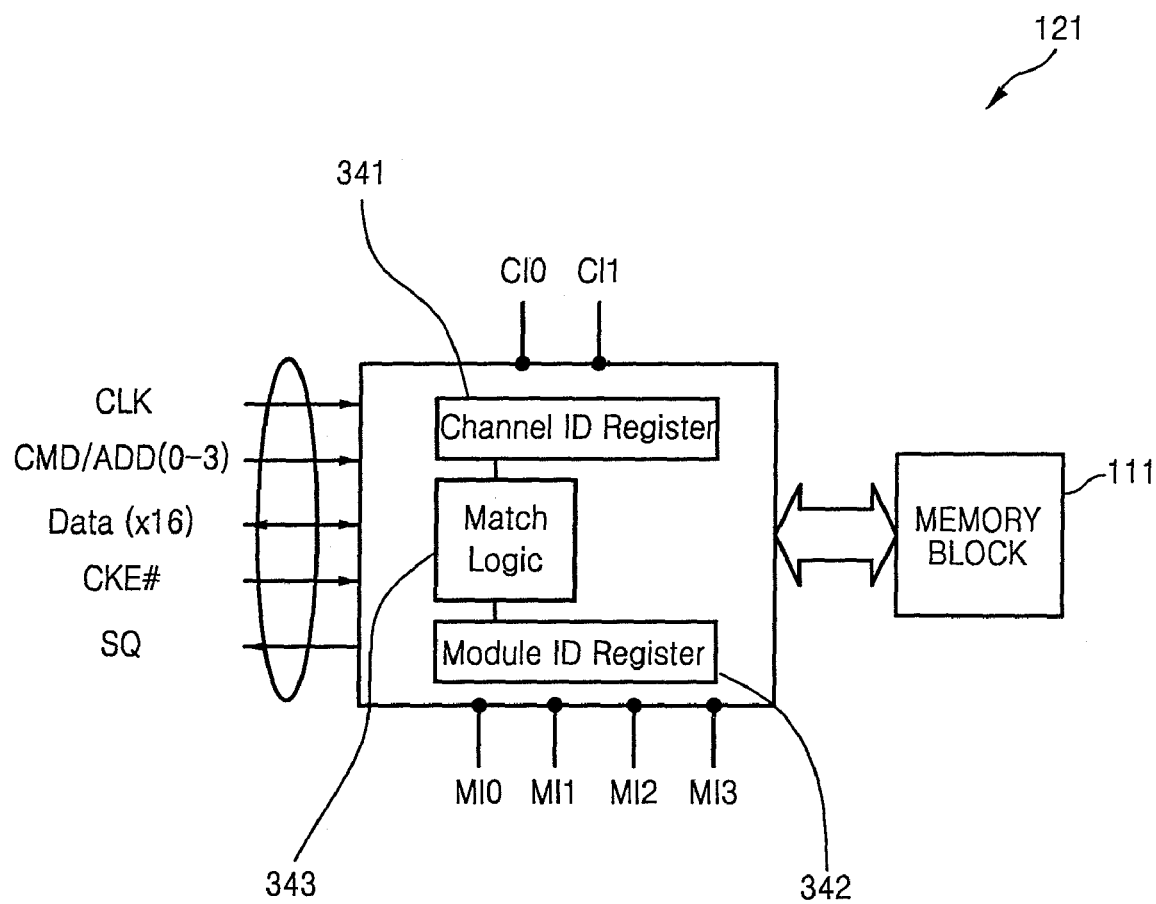
FIG. 6 is a schematic block diagram of a router 121 shown in FIG. 5.

FIG. 6 is a schematic block diagram of the router 121 shown in FIG. 5. All of the routers included in the memory module system 100 operate in the same manner, and therefore, only the first router 121 will be described. The router 121 includes a plurality of connection pins CI0, CI1, MI0, MI1, MI2, and MI3, a first register 341, a second register 342, and a match logic 343.

The connection pins CI0, CI1, MI0, MI1, MI2, and MI3 include first connection pins CI0 and CI1 for setting the channel ID and second connection pins MI0, MI1, MI2, and MI3 for receiving the module ID output from the module ID generator 130. Each of the first connection pins CI0 and CI1 receives the power supply voltage or the ground voltage. The first register 341 stores the channel ID based on the level of a voltage received via the first connection pins CI0 and CI1. For instance, when all of the first connection pins CI0 and CI1 receive the ground voltage, the first register 341 stores "00" as the channel ID. In the same manner, the second through fourth routers 122 through 124 shown in FIG. 5 store "01", "10", and "11" in their first registers, respectively, as their channel IDs based on the levels of the voltages received through the first connection pins.

The second connection pins MI0, MI1, MI1, and MI3 receive the module ID output from the module ID generator 130. The second register 342 receives the module ID output from the module ID generator 130 via the second connection pins MI0, MI1, MI2, and MI3 and stores it as a module ID. For instance, the module ID of the memory module 101 can be set to "0000" by connecting all switches of the module ID generator 130 with the ground voltage. In the same manner, module IDs of other memory modules can be set by connecting each switch of the module ID generator 130 included in each memory module with the power supply voltage or the ground voltage.

In an example of the operation, the match logic 343 receives the second channel ID and the second module ID from the controller 200, compares the received second channel ID with the channel ID stored in the router 121 and the received second module ID with the module ID stored in the router 121, and enables the router 121 when the stored channel ID and the stored module ID are the same as the second channel ID and the second module ID, respectively. The second channel ID and the second module ID may be generated by the combination of a command and an address, which are output from the controller 200.

When the router 121 is enabled and accesses the memory block 111 connected with the router 121, the router 121 outputs a plurality of received control signals and received data to the memory block 111. For this operation, the router 121 may include a control circuit (not shown) for controlling the control signals and the data. The control signals may include a clock signal CLK, a command/address signal CMD/ADD, a clock control signal CKE#, and a status signal SQ.

The clock signal CLK is used to synchronize the control signals. The command/address signal CMD/ADD is used to access an address of the memory block 111 and perform a read, write or erase operation. In addition, the command/address signal CMD/ADD forms the received channel ID and the received module ID through a predetermined combination.

The clock control signal CKE# is used to enable or disable the clock signal CLK input to the router 121. The status signal SQ is used to inform the controller 200 of the status of the router 121 in response to a status check command output from the controller 200. For instance, after the controller 200 outputs a read command to the router 121, the status signal SQ may indicate whether data can be read.

The router 121 may include conventional control circuits (not shown) for performing bad block management, logical block and physical block management, and wear leveling with respect to the memory block 111 connected with the router 121.

A memory chip (e.g., NAND flash memory) typically includes bad blocks when it is manufactured. The bad block management is a process of managing an address of a bad block, collecting information about a bad block occurring during the operation of the memory, and controlling the controller 200 not to access the bad blocks.

The logical block and physical block management is a process of mapping logical addresses and physical addresses of the memory blocks 111, 112, 113, and 114 when the controller 200 accesses the memory blocks 111 through 114.

Memory cells included in each memory block are "aged" (i.e., worn down) while data is written into and erased from flash memory. The wear leveling is a process of examining the aging state of the memory cells and determining whether the memory cells can be used afterwards.

Figure 7:
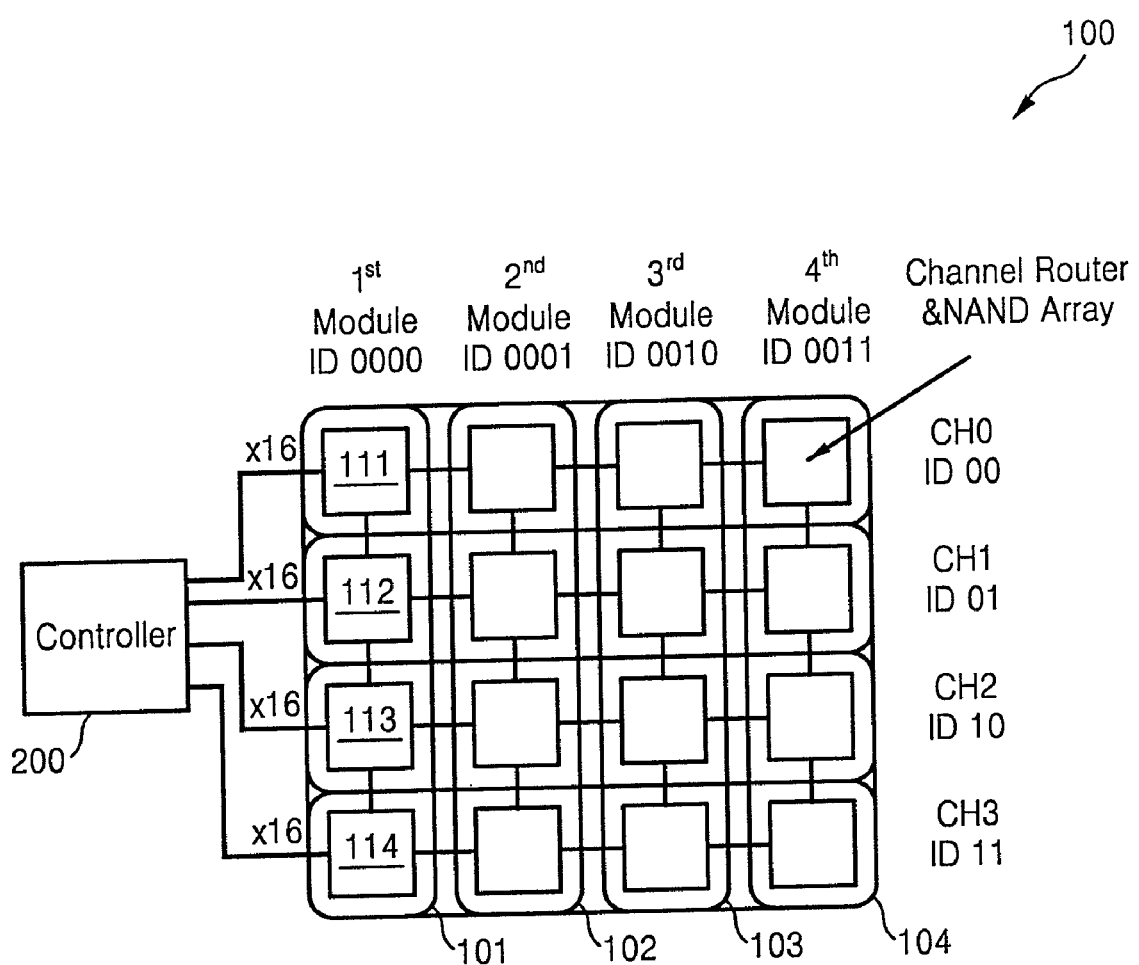
FIG. 7 is a schematic block diagram illustrating the connections between the controller 200 and memory blocks shown in FIG. 3.

FIG. 7 is a block diagram illustrating the connections between the controller 200 and memory blocks shown in FIG. 3. Referring to FIGS. 3 through 7, when the controller 200 independently accesses the memory blocks included in the memory modules 101 through 104, each memory block can be independently accessed without necessarily using as many chip selection signals as the number of routers included in the memory modules. For instance, when the memory modules 101 through 104 receive a module ID of "0000" and a channel ID of "00" from the controller 200, only the first router 121 (having the module ID of "0000" and the channel ID of "00") is enabled. Accordingly, only the first memory block 111 included in the first memory module 101 is enabled. As a result, the memory module system 100 can independently and continuously access the memory blocks 111 through 114 included in the memory modules 101 through 104.

Figure 8B:
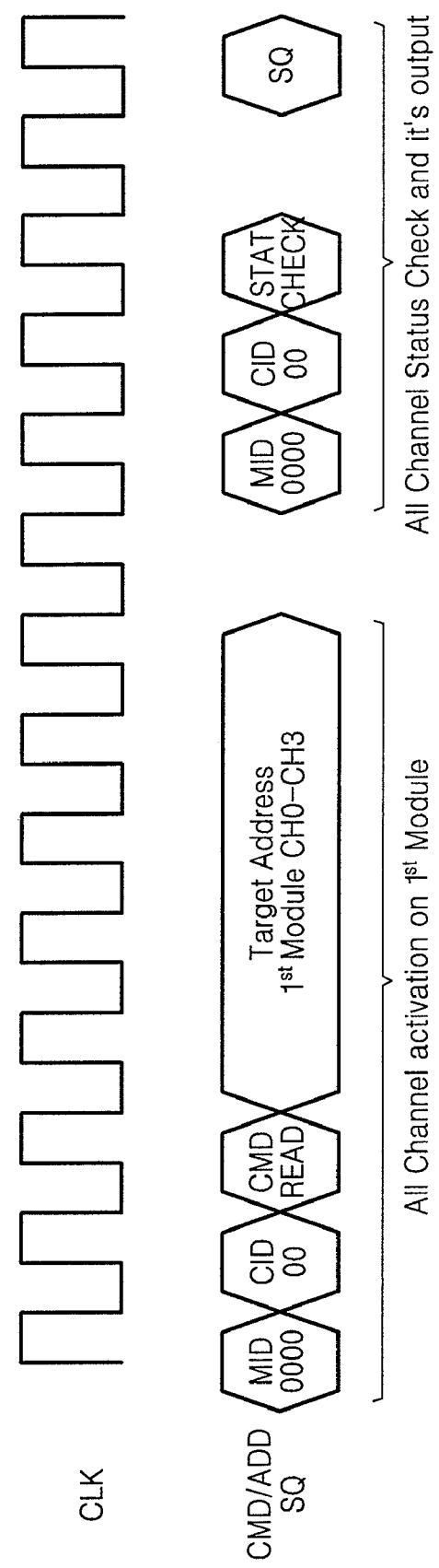
FIG. 8B is a timing chart of a simultaneous access operation in the memory module system of FIG. 5.

FIG. 8A is a timing chart illustrating an independent access operation in the memory module system of FIG. 5. FIG. 8B is a timing chart of a simultaneous access operation in the memory module system of FIG. 5.

Referring to FIGS. 3 through 8A, when the controller 200 outputs a module ID MID (e.g., "0000") and a channel ID CID (e.g., "00") for an access to the memory modules 101 through 104, the first router (121) among the plurality of the routers 121 through 124 in the first memory module 101, which stores the same values as the module ID MID (e.g., "0000") and the channel ID CID (e.g., "00"), is enabled. Accordingly, the first router 121 receives a command and an address transmitted continuously and allows the memory block 111 connected with the router 121 to be independently accessed based on the received command and address.

After the access through the first router 121 is completed, the controller 200 may output another combination of module ID MID (e.g., "0001") and channel ID CID (e.g., "01") for another access. In this example, the second router 122 included in the second memory module 102, which stores the same values as the module ID MID (e.g., "0001") and the channel ID CID (e.g., "01"), is enabled.

Consequently, since the routers 121 through 124 included in each of the memory modules 101 through 104 have different channel IDs from one another, independent access can be accomplished.

FIG. 8B is a timing chart illustrating the simultaneous access operation in the memory module system of FIG. 5. Referring to FIGS. 3 through 8B, in a case where the routers 121 through 124 included in each of the memory modules 101 through 104 store the same channel ID, e.g., "00", when the controller 200 outputs a module ID MID (e.g., "0000") and a channel ID CID (e.g., "00") for an access, all the routers 121 through 124 included in the first memory module 101, which all store the same values as the module ID MID (e.g., "0000") and the channel ID CID (e.g., "00") are enabled. In other words, the first through fourth routers 121 through 124 included in the first memory module 101 are simultaneously enabled. Accordingly, the controller 200 can simultaneously access the memory blocks 111 through 114 respectively connected with the enabled routers 121 through 124 in the first memory module 101. At this time, if 16 bits of data are transmitted via the first channel CH1, 64 bits of data can be simultaneously transmitted during the simultaneous access operation.

After the access to the memory block 111 is completed, the controller 200 may sequentially output a different module ID MID and channel ID CID, and a status check signal STAT CHECK and the router 121 outputs a status signal SQ to the controller 200 in response to the status check signal STAT CHECK.

Alternatively, if a pair of routers (e.g., 121 and 122) on a memory module (e.g., 101) store the same channel ID CID (e.g., "00") the controller 200 can simultaneously access a pair of memory blocks (e.g., 111 and 112) respectively connected with the enabled routers (e.g., 121 and 122) in the memory module (e.g., 101). At this time, if 16 bits of data are transmitted via the first channel CH1, 32 bits of data can be simultaneously transmitted during the simultaneous access operation. Likewise, if a second pair of routers (e.g., 123 and 124) on the same memory module (e.g., 101) store the same channel ID CID (e.g., "01") the controller 200 can simultaneously access a second pair of memory blocks (e.g., 113 and 114) respectively connected with the enabled routers (e.g., 123 and 124) in the memory module (e.g., 101). At this time, if 16 bits of data are transmitted via the first channel CH1, 32 bits of data can be simultaneously transmitted during the simultaneous access operation. Thus, a memory module in the memory module system 100 as shown in FIG. 5 can store 16-bit, 32-bit, or 64-bit data.

Referring to FIGS. 8A and 8B, the controller 200 in the memory module system 100 can selectively perform either an independent access or a simultaneous access of the memory blocks 111 through 114.

As described above, according to some embodiments of the present invention, a memory module includes a plurality of routers, thereby reducing the number of control signals pins in a controller and also reducing the size of the controller on a motherboard. In addition, memory blocks in the memory module can be independently or simultaneously accessed. Accordingly, the memory module and a memory module system using the memory module can support capacity extension and data continuity.

While the present invention has been shown and described with reference to exemplary embodiments thereof, it will be understood by those of ordinary skill in the art that various changes in form and detail may be made herein without departing from the spirit and scope of the present invention, as defined by the following claims. In the claims, the symbol N represents a natural number greater than one.

What is claimed is:

1. A memory module comprising:
 a plurality of memory blocks; and
 a plurality of routers, wherein each one of the routers is connected with a corresponding one of the memory blocks and stores a channel identification (ID) and a module ID, wherein the channel ID identifies a channel that the corresponding memory block is connected with, and wherein the module ID identifies and distinguishes the memory module from other memory modules, and wherein each of the routers is configured to compare a received channel ID with the stored channel ID and compare a received module ID with the stored module ID, and enables access to its corresponding memory block when the comparisons indicates that the received channel ID matches the stored channel ID and the received module ID matches the stored module ID.

2. The memory module of claim 1, wherein each of the routers comprises:
 a first register configured to store the stored channel ID;
 a second register configured to store the stored module ID; and
 a comparison circuit configured to receive the received channel ID and the received module ID from a controller, to compare the received channel ID with the stored channel ID, and to compare the stored channel ID with the stored module ID.

3. The memory module of claim 2, wherein two of the routers are enabled simultaneously when the two routers store the same channel ID in their first registers; and wherein the two routers are not enabled simultaneously when the two routers store two different channel IDs in their first registers.

4. The memory module of claim 1, further comprising a module ID generator configured to generate a module ID for each of the routers.

5. The memory module of claim 4, wherein the module ID generator is implemented using a dual in-line package (DIP) switch.

6. The memory module of claim 1, wherein each of the routers comprises a plurality of pins used to set the stored channel ID and the stored module ID, wherein each pin is configured to alternatively receive a first voltage and a second voltage which are used to set the set the stored channel ID and the stored module ID.

7. The memory module of claim 1, wherein each of the memory blocks comprises at least one NAND flash memory chip.

8. A memory module system comprising:
 a first memory module having a plurality of memory blocks and a plurality of corresponding routers, wherein each router is configured to store a module identification (ID) and a channel ID, wherein the channel ID identifies a channel that the corresponding memory block is connected with, and wherein the module ID identifies and distinguishes the first memory module from other memory modules; and
 a controller configured to access the first memory module, wherein the controller outputs a module ID corresponding to the first memory module and a channel ID corresponding to at least one of the memory blocks of the first memory module to access the corresponding memory blocks.

9. The memory module system of claim 8, wherein each of the routers comprises:
 a first register configured to store a channel ID;
 a second register configured to store a module ID; and
 a comparison circuit configured to compare the stored channel ID with a received channel ID from the controller and compare the stored module ID with a received module ID from the controller and to enable access to the memory block connected to the router when the comparisons indicates that the received channel ID matches the stored channel ID and the received module ID matches the stored module ID.

10. The memory module system of claim 9,
wherein two of the routers are enabled simultaneously when the two routers store the same channel ID in their first registers; and
wherein the two routers are not enabled simultaneously when the two routers store two different channel IDs in their first registers.

11. The memory module system of claim 8, wherein each of the routers comprises a plurality of pins used to set the channel ID and the module ID to be stored in its first register and second register respectively, each pin configured to alternately receive a first voltage and a second voltage.

12. The memory module system of claim 8, further comprising a second memory module, wherein each of the first and second memory modules includes a module ID generator configured to generate a module ID for each of its routers.

13. The memory module system of claim 12, wherein the module ID generator of each memory module is implemented using a dual in-line package (DIP) switch.

14. The memory module system of claim 8,
wherein the stored channel ID and the stored module ID are set for each of the routers to identify at least one of the memory blocks, and
wherein the controller identifies and accesses at least one of the memory blocks by outputting a channel ID and a module ID.

15. The memory module system of claim 8, wherein each of the memory blocks comprises at least one NAND flash memory chip.

16. The memory module system of claim 8, wherein the controller generates a command and an address used to access a memory block and outputs the command and the address to all the routers.

17. A motherboard comprising:
a controller configured to output a channel identification (ID) and a module ID to access a memory block of a memory module; and
a memory slot configured to receive the memory module, wherein the memory module comprises first and second memory blocks and corresponding first and second routers, wherein each router is configured to receive the channel ID and the module ID output by the controller, and
wherein the channel ID identifies a channel that the memory block is configured to be connected with, and wherein the module ID identifies and distinguishes the memory module from other memory modules.

18. The motherboard of claim 17,
wherein each of the first and second memory blocks is independently accessed if different channel IDs are stored in each router and based upon the channel ID output by the controller, and
wherein both of the first and second memory blocks are simultaneously accessed if the same channel ID is stored in both corresponding routers and if the channel ID output by the controller matches the channel ID stored in both corresponding routers.

19. The motherboard of claim 17, wherein the controller is configured to store channel IDs output by the routers during an initialization.

* * * * *